(12) United States Patent
Vau et al.

(10) Patent No.: US 7,378,611 B2
(45) Date of Patent: May 27, 2008

(54) APPARATUS AND METHOD FOR ELECTRICAL DISCHARGE MACHINING

(75) Inventors: James Marion Vau, Los Lunas, NM (US); Rudi Oskar Krenz, Albuquerque, NM (US)

(73) Assignee: General Electric Company, Schenectady, NY (US)

( * ) Notice: Subject to any disclaimer, the term of this patent is extended or adjusted under 35 U.S.C. 154(b) by 503 days.

(21) Appl. No.: 10/804,638

(22) Filed: Mar. 19, 2004

(65) Prior Publication Data

US 2008/0041826 A1 Feb. 21, 2008

(51) Int. Cl.
*B23H 7/26* (2006.01)
*B23H 9/14* (2006.01)

(52) U.S. Cl. .................................... 219/69.15

(58) Field of Classification Search .............. 219/69.15, 219/69.17, 69.2
See application file for complete search history.

(56) References Cited

U.S. PATENT DOCUMENTS

| | | | | | |
|---|---|---|---|---|---|
| 3,281,343 | A | * | 10/1966 | O'Connor | 219/69.17 |
| 3,454,738 | A | * | 7/1969 | Brookshire | 219/69.2 |
| 3,890,481 | A | * | 6/1975 | Buck | 219/69.2 |
| 3,981,786 | A | * | 9/1976 | Andrews | 219/69.15 |
| 4,430,544 | A | * | 2/1984 | Inoue | 219/69.2 |
| 4,544,820 | A | * | 10/1985 | Johnson | 219/69.15 |
| 4,792,654 | A | * | 12/1988 | Trujillo | 219/69.2 |
| 5,028,755 | A | * | 7/1991 | Pertler | 219/69.2 |
| 5,847,350 | A | * | 12/1998 | Dorrel et al. | 219/69.15 |
| 6,326,576 | B1 | | 12/2001 | Krenz et al. | 219/69.11 |
| 6,336,767 | B1 | * | 1/2002 | Nordquist et al. | 403/353 |
| 6,369,343 | B1 | | 4/2002 | Krenz et al. | 219/69.11 |
| 6,485,630 | B1 | * | 11/2002 | Gangopadhyay et al. | 219/69.2 |
| 6,563,071 | B2 | | 5/2003 | Krenz | 219/69.13 |
| 6,609,851 | B2 | * | 8/2003 | Nordquist et al. | 403/279 |
| 6,844,515 | B2 | * | 1/2005 | Byrnes et al. | 219/69.17 |

FOREIGN PATENT DOCUMENTS

| | | | | |
|---|---|---|---|---|
| JP | 60-29248 | A | * | 2/1985 |
| JP | 60-259319 | A | * | 12/1985 |
| JP | 2-243223 | A | * | 9/1990 |
| JP | 6-8060 | A | * | 1/1994 |
| JP | 6-126541 | A | * | 5/1994 |
| JP | 8-118157 | A | * | 5/1996 |
| JP | 9-108943 | A | * | 4/1997 |

* cited by examiner

*Primary Examiner*—Geoffrey S. Evans
(74) *Attorney, Agent, or Firm*—William Scott Andes; James P. Davidson

(57) ABSTRACT

A work station for an electrical discharge machining apparatus, including a first mechanism for retaining a workpiece in a predetermined position, at least one electrode for forming a feature on the workpiece, and a second mechanism for positioning the electrode in a manner that is movable into and out of engagement with a designated portion of the workpiece. A portion of the second mechanism is connected to the first mechanism so as to automatically align the electrode with the designated portion of the workpiece. The second mechanism is configured so that the electrode is electrically insulated from the workpiece.

19 Claims, 13 Drawing Sheets

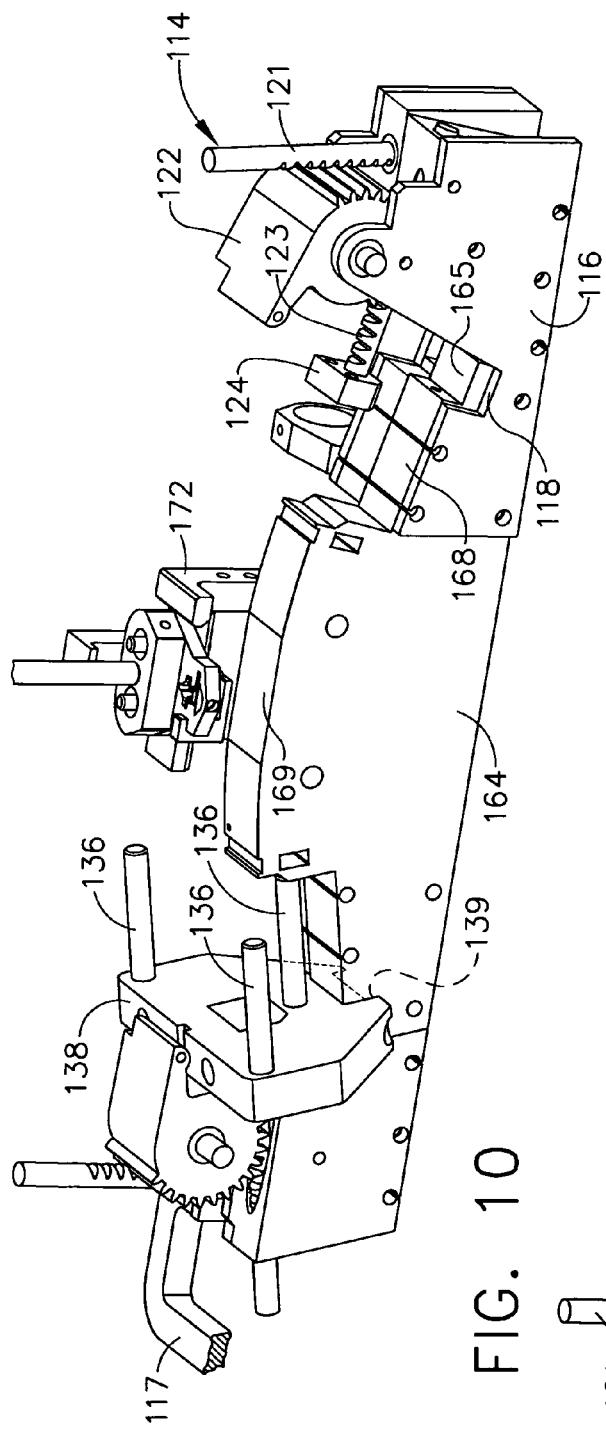
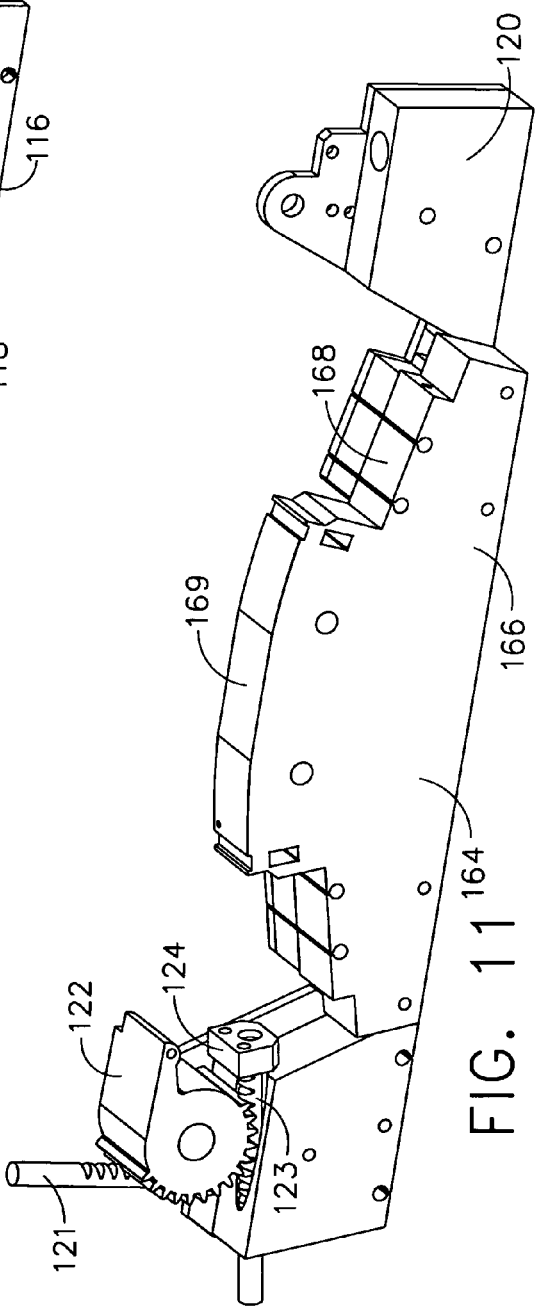
FIG. 10
FIG. 11

APPARATUS AND METHOD FOR ELECTRICAL DISCHARGE MACHINING

BACKGROUND OF THE INVENTION

The present invention relates generally to an apparatus and method for electrical discharge machining and, in particular, to an apparatus and method for electrical discharge machining which includes an improved work station that provides automatic alignment of the electrode to the workpiece.

Electrical discharge machining (EDM) is a well known process for forming features, such as holes, slots and notches of various shapes and configurations, in an electrically conductive workpiece. Conventional EDM apparatuses typically employ an electrode having the desired shape that is advanced toward the workpiece. A suitable power supply is applied to create an electrical potential between the workpiece and electrode for forming a controlled spark which melts and vaporizes the workpiece material to form the desired feature. The cutting pattern of the electrode is usually computer numerically controlled (CNC) whereby servomotors control the relative positions of the electrode and workpiece. During machining, the electrode and workpiece are immersed in a dielectric fluid, which provides insulation against premature spark discharge, cools the machined area, and flushes away the removed material.

One drawback to electrical discharge machining is that it is a relatively slow process, especially when several distinct features need to be machined into a workpiece. This is particularly so in the aircraft engine industry where electrical discharge machining is widely used for machining various features into aircraft engine parts. To increase the manufacturing output of such parts, it is common to use an EDM apparatus that machines a number of parts at one time. Such an apparatus has a plurality of work stations, each of which has a workpiece fixture located in a single dielectric tank. The work stations are all typically connected to a common power supply. Thus, machining takes place in series one part at a time. That is, a spark will be created in the first work station and then the next work station and so on until each station has a spark supplied. This sequence is repeated until the machining operation is completed for each workpiece.

A problem with this type of apparatus is that whenever one station gets hung up (i.e., fails to discharge for some reason such as electrode misalignment or a EDM particle remaining in the electrode-workpiece gap) all of the stations will become hung up. Since all stations are stopped, it is not evident which station is causing the stoppage. Furthermore, each station must use the same electrode material and polarity because of the series power connection. Thus, each station machines the same feature into the parts. Parts requiring additional features must then be moved to another machine. This means that multiple machines, fixtures and part handling are required before a part is completed Another inefficiency with these conventional EDM apparatuses is that the dielectric tank must be drained and refilled between each cycle to load and unload the parts because the workpiece fixtures are all located and submerged in the tank.

Various approaches to solving such problems are disclosed in U.S. Pat. No. 6,326,576 to Krenz et al., U.S. Pat. No. 6,369,343 to Krenz et al., and U.S. Pat. No. 6,563,071 to Krenz. While each EDM apparatus disclosed in such patents is useful for its intended purpose, it will be appreciated that the slide mechanism which houses the electrode is indirectly connected to a base supporting the workpiece. Accordingly, the slide mechanism moves along a plurality of ceramic rods into position with respect to a workpiece. In this way, the electrode is electrically insulated from the fixtures retaining the workpiece. Not only do such ceramic rods and its related components increase the bulkiness of the slide mechanism, this type of configuration also produces stack-up errors which require manual alignment of the electrode to each workpiece by the machine operator. This introduces a window of error if the electrode is incorrectly aligned, as well as a measure of inefficiency to the process.

Accordingly, it would be desirable for an electrical discharge machining apparatus to be developed which includes a work station which automatically aligns an electrode with a workpiece so as to form a desired feature. It would also be desirable for the work station of such EDM apparatus to be greatly reduced in size and complexity so that multiple features can more easily be formed in a workpiece.

BRIEF SUMMARY OF THE INVENTION

In a first exemplary embodiment of the invention, a work station for an electrical discharge machining apparatus is disclosed as including a first mechanism for retaining a workpiece in a predetermined position, at least one electrode for forming a feature on the workpiece, and a second mechanism for positioning the electrode in a manner that is movable into and out of engagement with a designated portion of the workpiece. A portion of the second mechanism is connected to the first mechanism so as to automatically align the electrode with the designated portion of the workpiece. The second mechanism is configured so that the electrode is electrically insulated from the workpiece. The second mechanism further includes: a stationary first portion including a plurality of shaft members retained in a shaft housing, wherein the shaft members are arranged in a predetermined spaced relation; a second portion for retaining and positioning the electrode, where the second portion includes a plurality of openings therein which are slidably positioned on the shaft members; and, a bearing positioned between a surface defining each opening in the second portion and each shaft member, wherein the bearings have electrically insulating properties.

In a second exemplary embodiment of the invention, an electrical discharge machining apparatus for forming features in a workpiece is disclosed as including: a dielectric tank; at least one work station disposed in the tank, where each work station further includes a first mechanism for retaining a workpiece in a predetermined position, at least one electrode for forming a feature on the workpiece, and a second mechanism for positioning the electrode in a manner that is movable into and out of engagement with a designated portion of the workpiece; a device for supplying power to the electrode; a device for supplying power to the electrode; and, a device for controlling the position of the second mechanism. The second mechanism is configured so that the electrode is electrically insulated from the workpiece.

In accordance with a third embodiment of the invention, a method of electrical discharge machining a workpiece in a work station is disclosed as including the following steps: providing a first mechanism for retaining the workpiece in a predetermined position; providing at least one electrode; providing a second mechanism for positioning the electrode in a desired manner; connecting the first mechanism and a portion of the second mechanism so as to automatically align the electrode with a designated portion of the workpiece; electrically insulating the electrode from the workpiece; loading the workpiece into the first mechanism; and, moving a second portion of the second mechanism with respect to the first mechanism so that the electrode is brought into and out of engagement with the workpiece to form a desired feature therein.

BRIEF DESCRIPTION OF THE DRAWINGS

FIG. 10 is a front perspective view of the work station depicted in FIG. 9, where certain portions of the first mechanism and the second mechanism have been omitted for clarity;

FIG. 11 is a front perspective view of the work station depicted in FIG. 10, where additional components of the second mechanism are omitted for clarity;

DETAILED DESCRIPTION OF THE INVENTION

Figure 1:
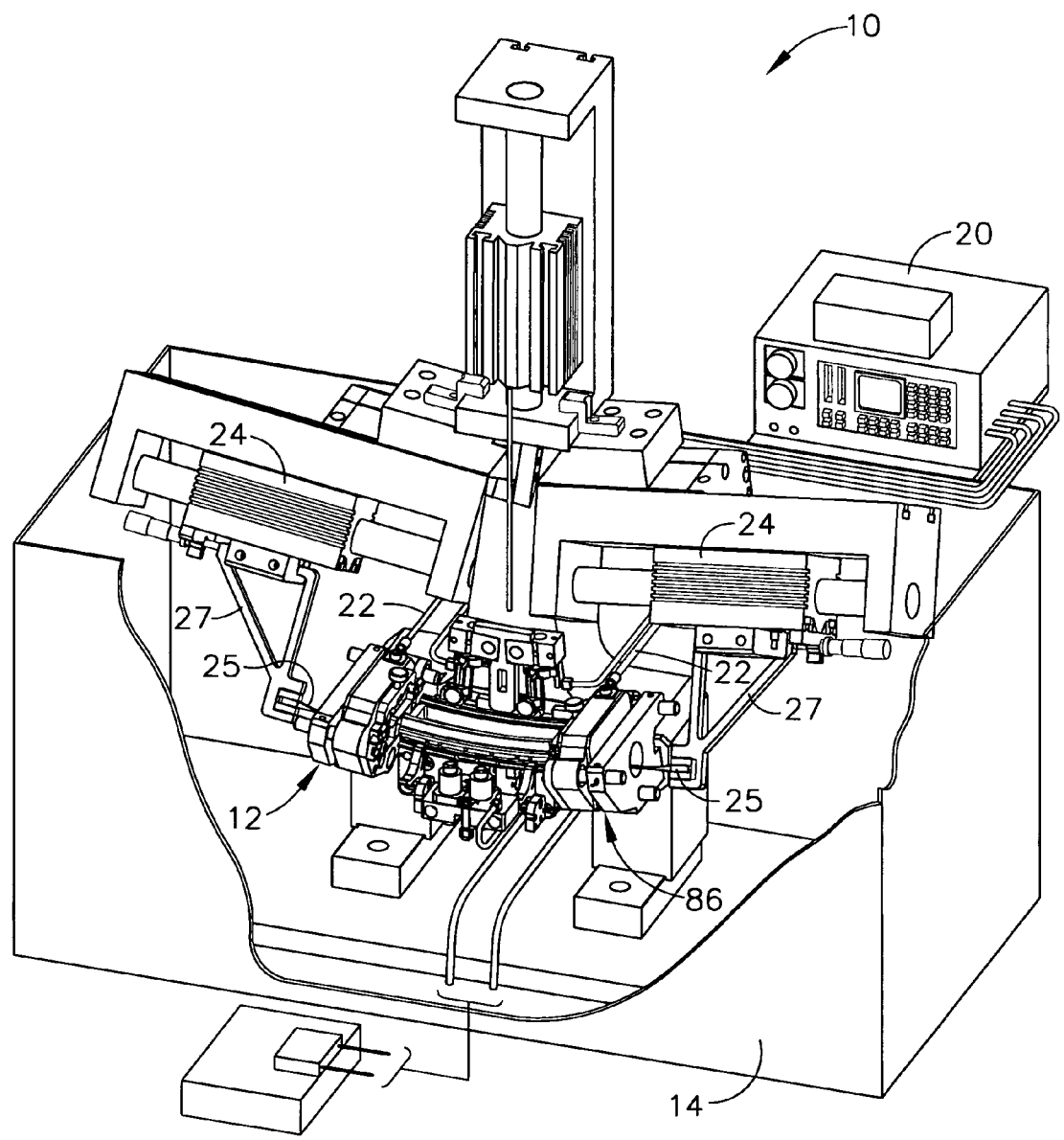
FIG. 1 is a front perspective view of an EDM apparatus in accordance with the present invention, where a portion of the tank is cut away for clarity.

Referring now to the drawings in detail, wherein identical numerals indicate the same elements throughout the figures, FIG. 1 depicts an electrical discharge machining (EDM) apparatus 10. EDM apparatus 10 includes at least one work station 12 disposed in a tank 14, which is shown in partial cut-away to reveal work station 12 therein. Although only one work station 12 is shown in FIG. 1 for purposes of illustration, it should be noted that additional such stations, operating independently, could be disposed in tank 14. In this way, EDM apparatus 10 could machine multiple workpieces at the same time.

As is well known in the field, tank 14 is filled with a suitable dielectric fluid, such as a dielectric oil, so that a workpiece is immersed in the fluid. The dielectric fluid insulates against premature spark discharge, cools the machined area, and flushes away machining debris. A float switch (not shown) is preferably provided in tank 14 for detecting when the dielectric fluid reaches a sufficient depth, while a filtering system (not shown) is preferably connected to tank 14 for filtering the dielectric fluid.

EDM apparatus 10 also includes a standard EDM control system 20 which includes a power supply (or other spark generator) and a controller (e.g., a computer numerical control or CNC). The power supply of EDM control system 20 provides energy to work station 12 via power cables 22. As seen in FIG. 1, the controller is connected to one or more linear motors 24 which, in turn, control positioning of one or more electrodes during operation of EDM apparatus 10 is discussed in greater detail herein.

It will be appreciated that other patents, such as U.S. Pat. No. 6,536,071 to Krenz, disclose in detail a work station configuration which involves electrodes being positioned above and/or below a workpiece which are moved to form desired features therein. The present invention is concerned with the positioning of one or more electrodes at either or both sides of a workpiece, as well as at varying angles and orientations thereto, so that additional features may be formed substantially simultaneously in the workpiece. In this way, it is possible that all or most of the features to be formed in the workpiece may be performed in a single operation so as to maximize efficiency and reduce cost.

Figure 2:
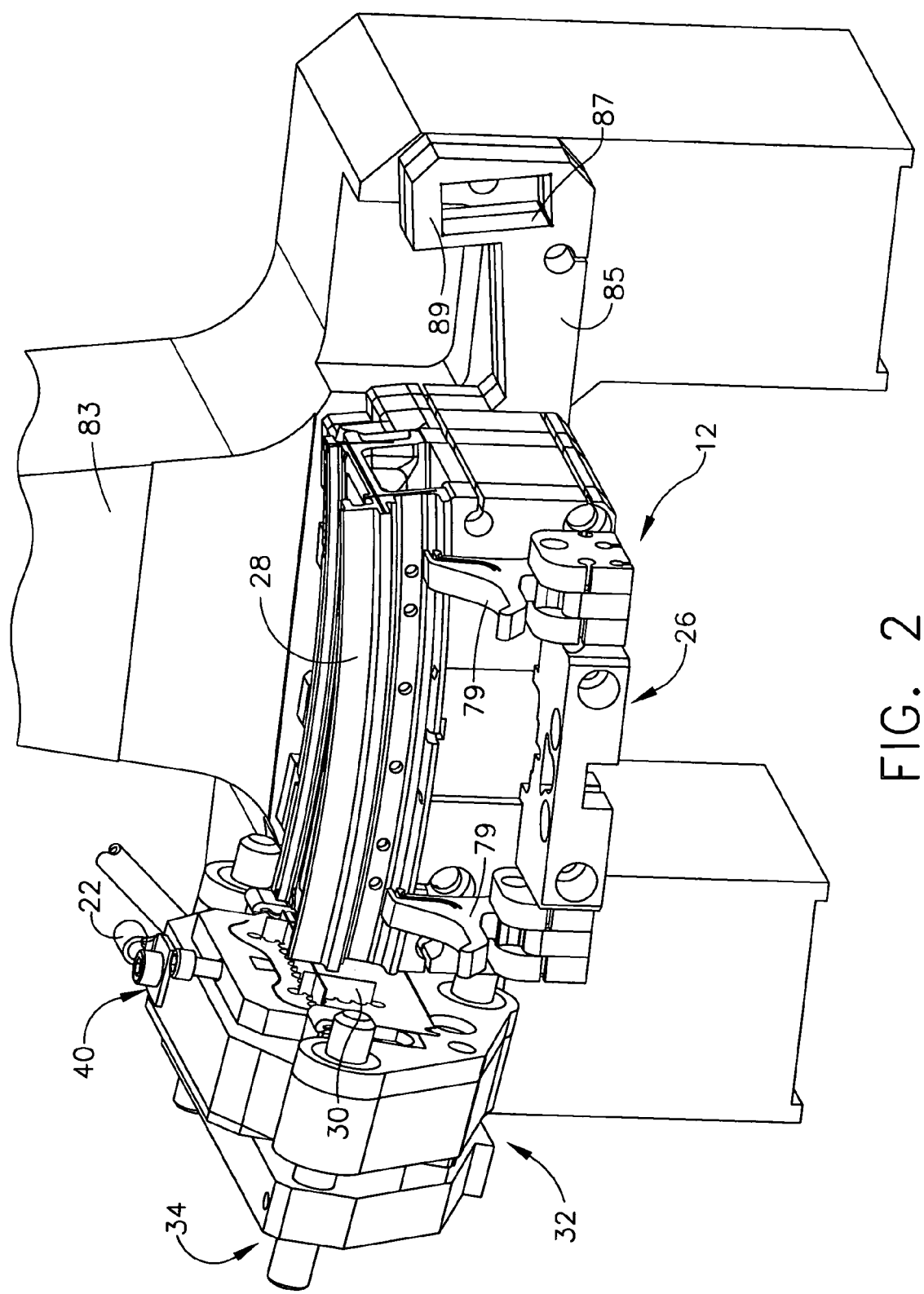
FIG. 2 is a front perspective view of the work station for the EDM apparatus shown in FIG. 1, where a workpiece is shown as being retained in a first mechanism.

It will be seen in FIG. 2 that work station 12 preferably includes a first mechanism 26 for retaining a workpiece 28 in a predetermined position. Work station 12 also includes at least one electrode 30 for forming a feature on workpiece 28 (see FIG. 4) and a second mechanism 32 for positioning electrode 30 in a manner that is movable into and out of engagement with a designated portion of workpiece 28. As discussed in further detail herein, it will be understood that second mechanism 32 includes a first portion 34 which is stationary and connected to first mechanism 26 so as to automatically align electrode 30 with the designated portion of workpiece 28. A second portion 40 of second mechanism 32, also known as a slide herein, functions to move electrode 30 relative to first portion 34 and therefore first mechanism 26. It will also be noted that second mechanism 32 is configured so that electrode 30 is electrically insulated from first mechanism 26 and workpiece 28.

It will be seen that an exemplary workpiece 28 depicted in FIG. 2 is a shroud for use in a gas turbine engine. A typical gas turbine engine employs a plurality of such shrouds arranged in an annular array around the engine's turbine rotor. The shrouds thus define an outer boundary for hot combustion gases flowing through the turbine. Shrouds are ordinarily made by a process in which a casting of the shroud is made and then various features are machined into the casting. It will be understood that certain features may be formed in the shroud by electrodes which are positioned above and below it, respectively, as disclosed in the prior art patents referenced herein. The present invention is concerned with the formation of features in the shroud at its ends, such as a seal slot. It should be noted that a shroud is only an illustrative example of one workpiece that is suitable for use with EDM apparatus 10. The present invention is not limited to such workpieces and is applicable to virtually any workpiece in which multiple features are machined.

Figure 4:
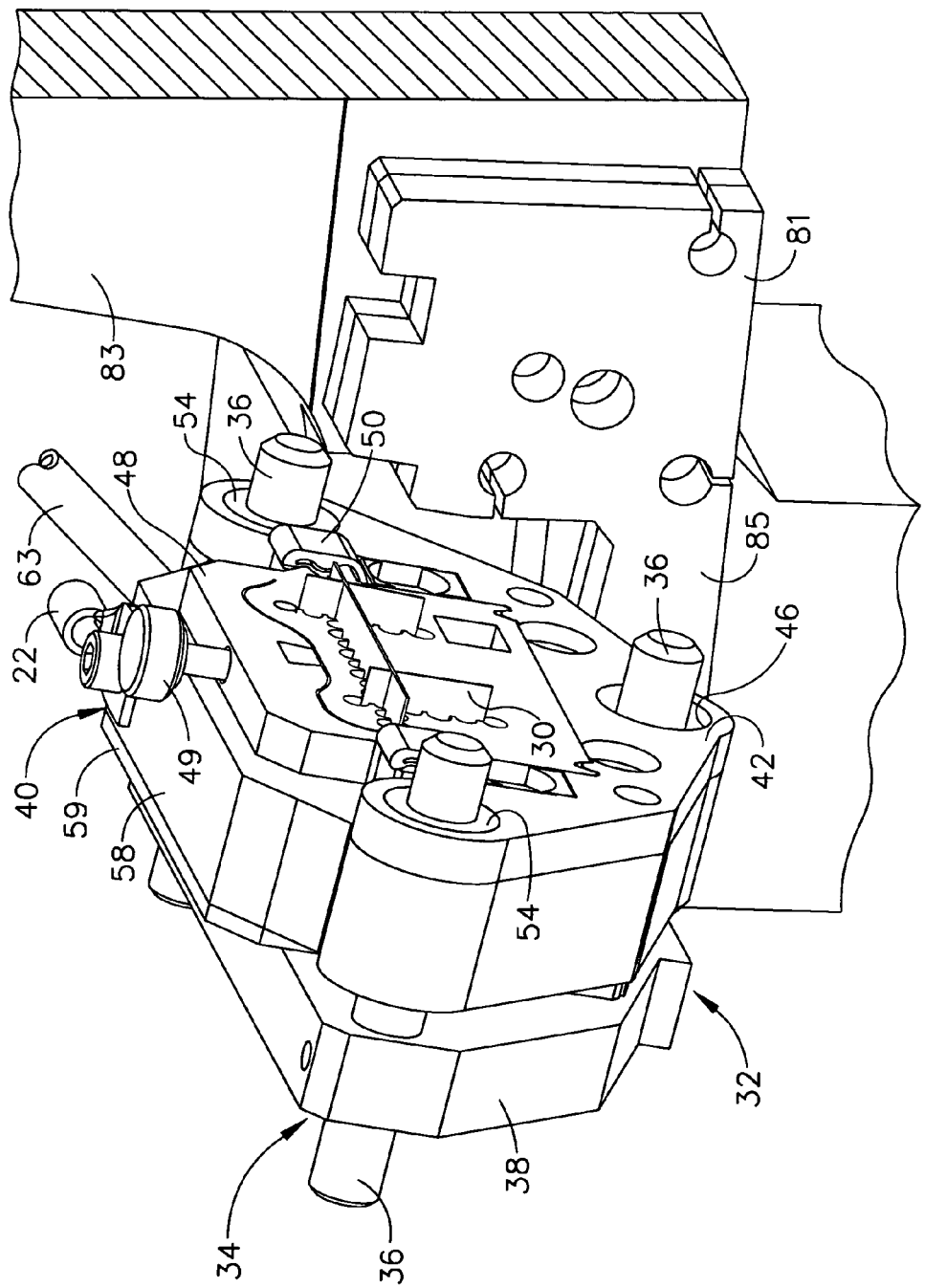
FIG. 4 is an enlarged, partial front perspective view of the work station depicted in FIGS. 2 and 3, where certain components of the first mechanism have been omitted for clarity.
Figure 5:
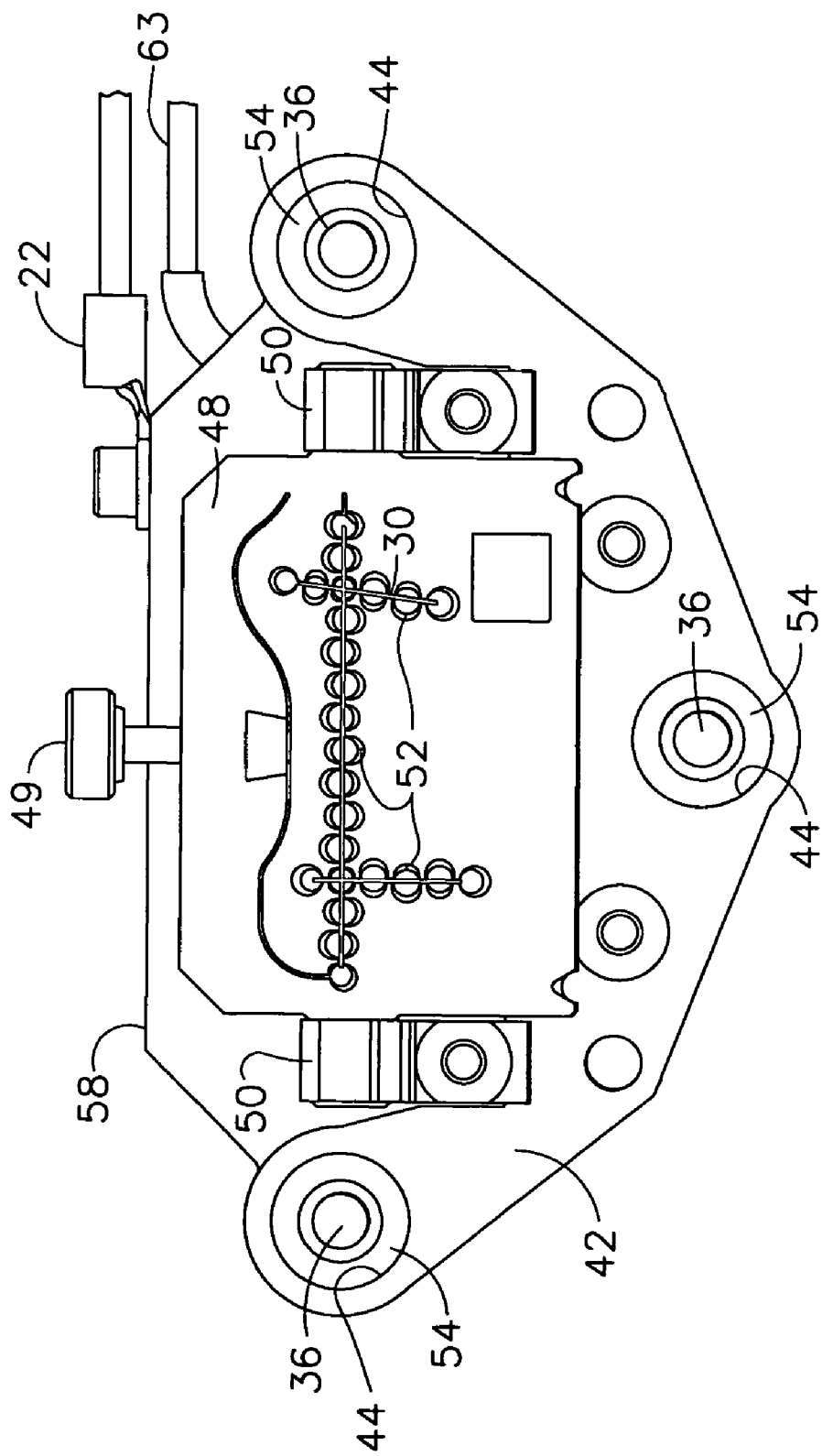
FIG. 5 is an enlarged side view of the second mechanism as depicted in FIGS. 2 and 4.
Figure 6:
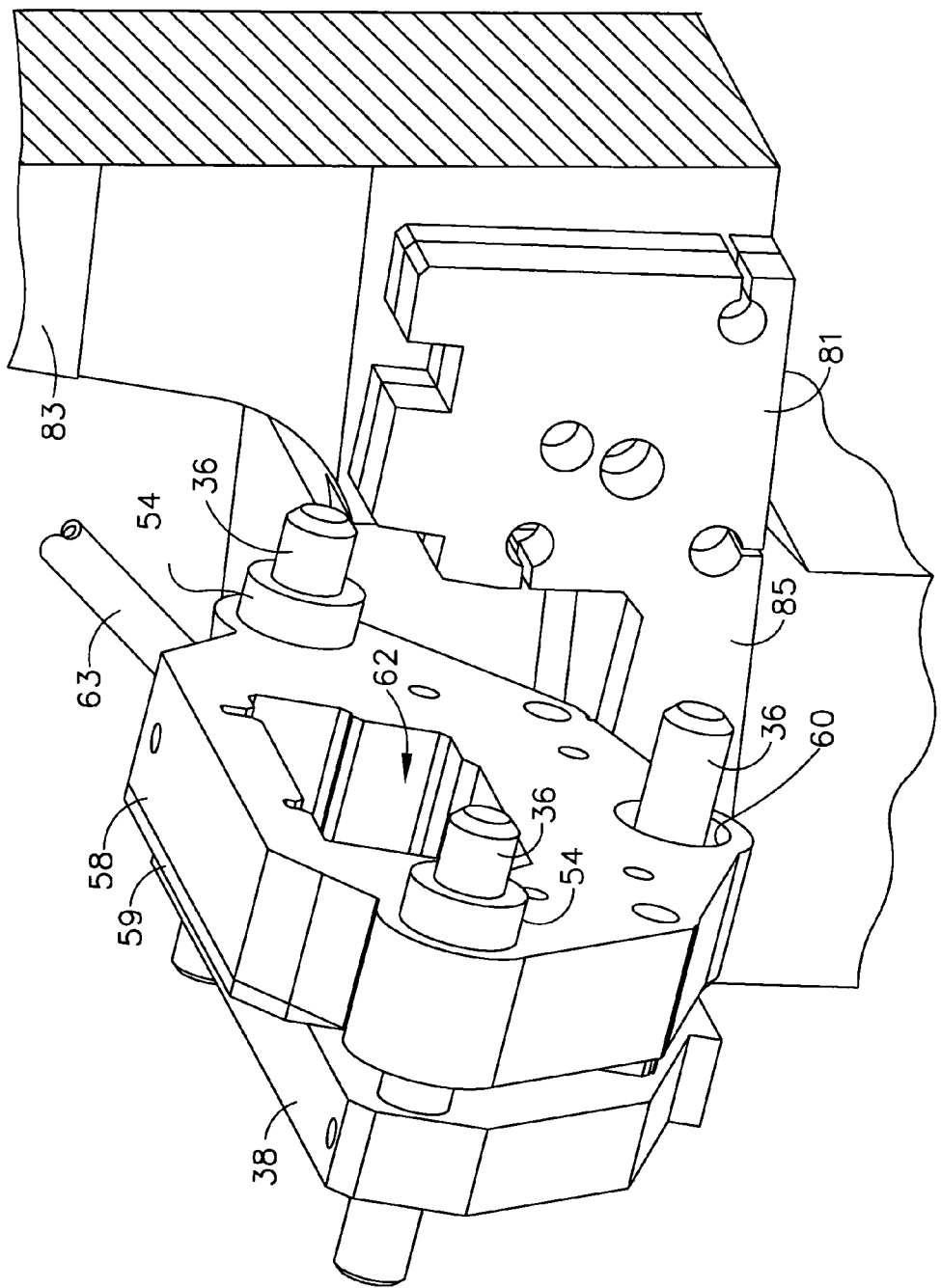
FIG. 6 is an enlarged, partial front perspective view of the workstation as depicted in FIG. 4, where certain components of the second mechanism have been omitted for clarity.

As best seen in FIGS. 4 and 5, first portion 34 of second mechanism 32 further includes a plurality of shaft members 36 retained in a shaft housing 38 in a predetermined spaced relation. It will be appreciated that shaft members 36 are positioned in spaced, parallel relation to each other. While a pair of shaft members 36 may be utilized, it is preferred that three shaft members 36 oriented in a substantially triangulated manner be provided. It will also be noted that shaft housing 38 includes a relatively large opening 39 formed in a middle portion thereof. This opening 39 is provided in order that a portion 25 of an arm member 27 connected to linear motor 24 is able to extend therethrough and connect to slide portion 40 (see FIG. 1). In this way, linear motor is able to move electrode 30 into and out of position with respect to workpiece 28 in accordance with signals from control system 20.

As stated above, second mechanism 32 also includes a second portion 40 for retaining and positioning electrode 30. Second portion 40 has a locator plate 42 which includes a plurality of openings 44 formed therein (defined by a surface 46), a holder plate 48 configured for retaining electrode 30 in a predetermined location, and at least one clip member 50 for connecting holder plate 48 and locator plate 42. It will be understood that holder plate 48 may be removed from locator plate 42, and indeed work station 12, by means of a knob 49 so that electrode 30 may be repaired or replaced. Holder plate 48 also preferably includes a plurality of openings 52 formed therein which are positioned adjacent electrode 30 so as to permit dielectric fluid to flush the area during operation and prevent damage to electrode 30.

Figure 8:
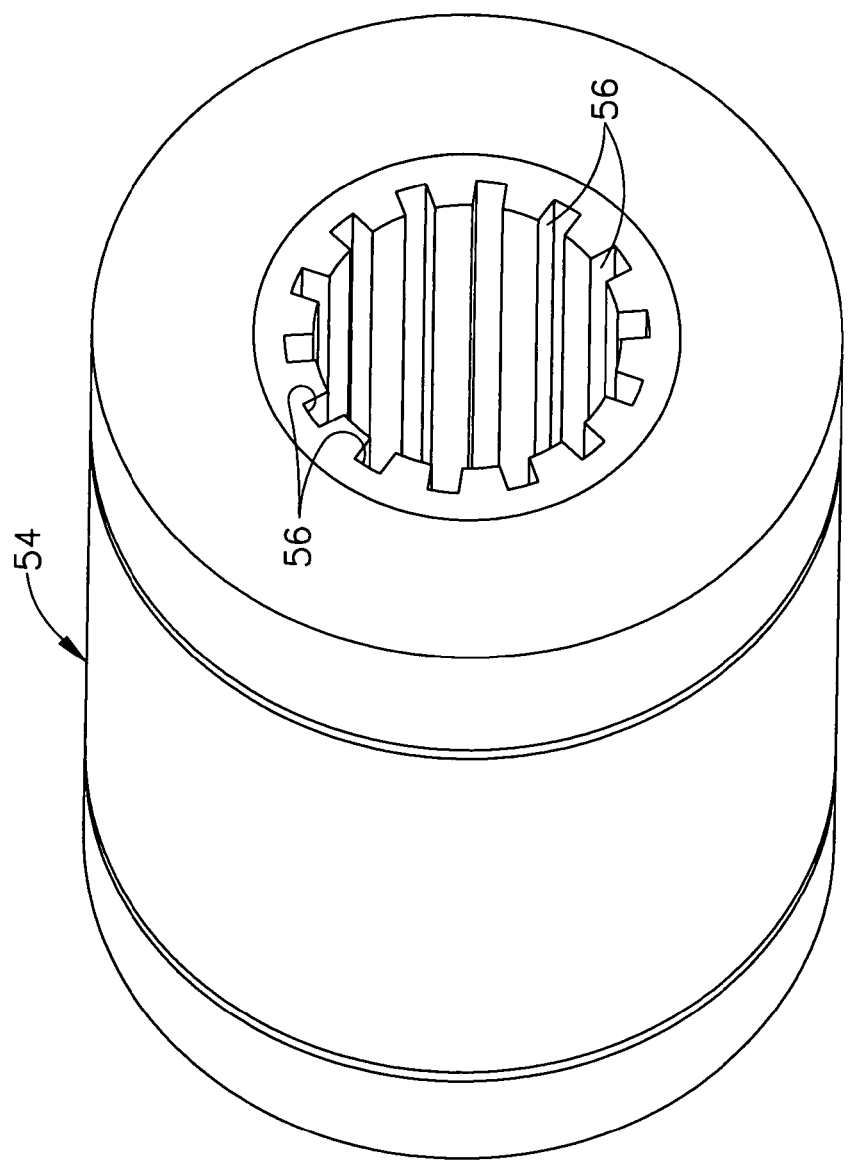
FIG. 8 is an enlarged perspective view of the bearing positioned between each shaft member and the slidable portion of the second mechanism for the work station.
Figure 9:
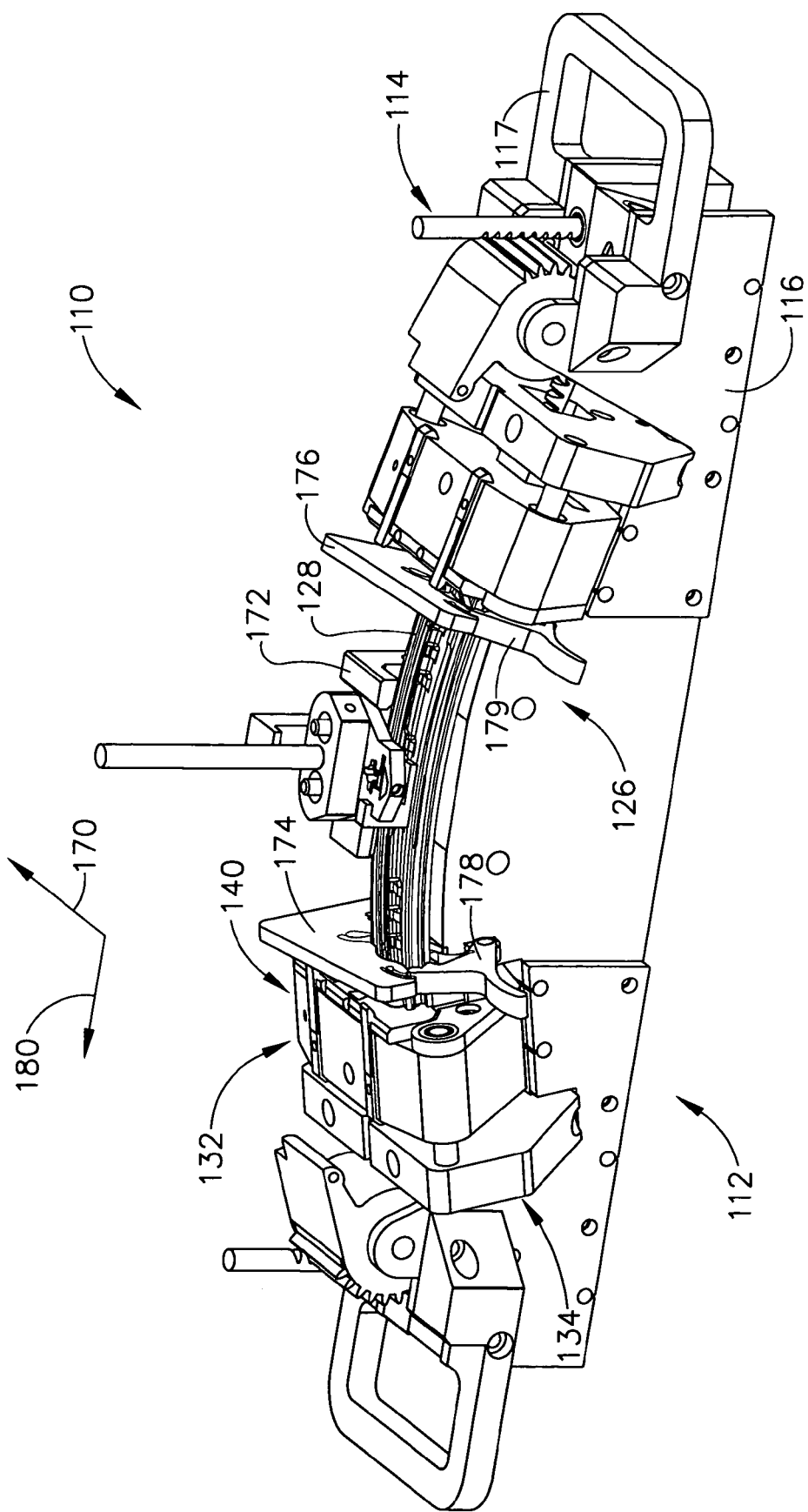
FIG. 9 is a front perspective view of an alternative embodiment of the work station for the EDM apparatus shown in FIG. 1, where a workpiece is shown as being retained in a first mechanism.
Figure 12:
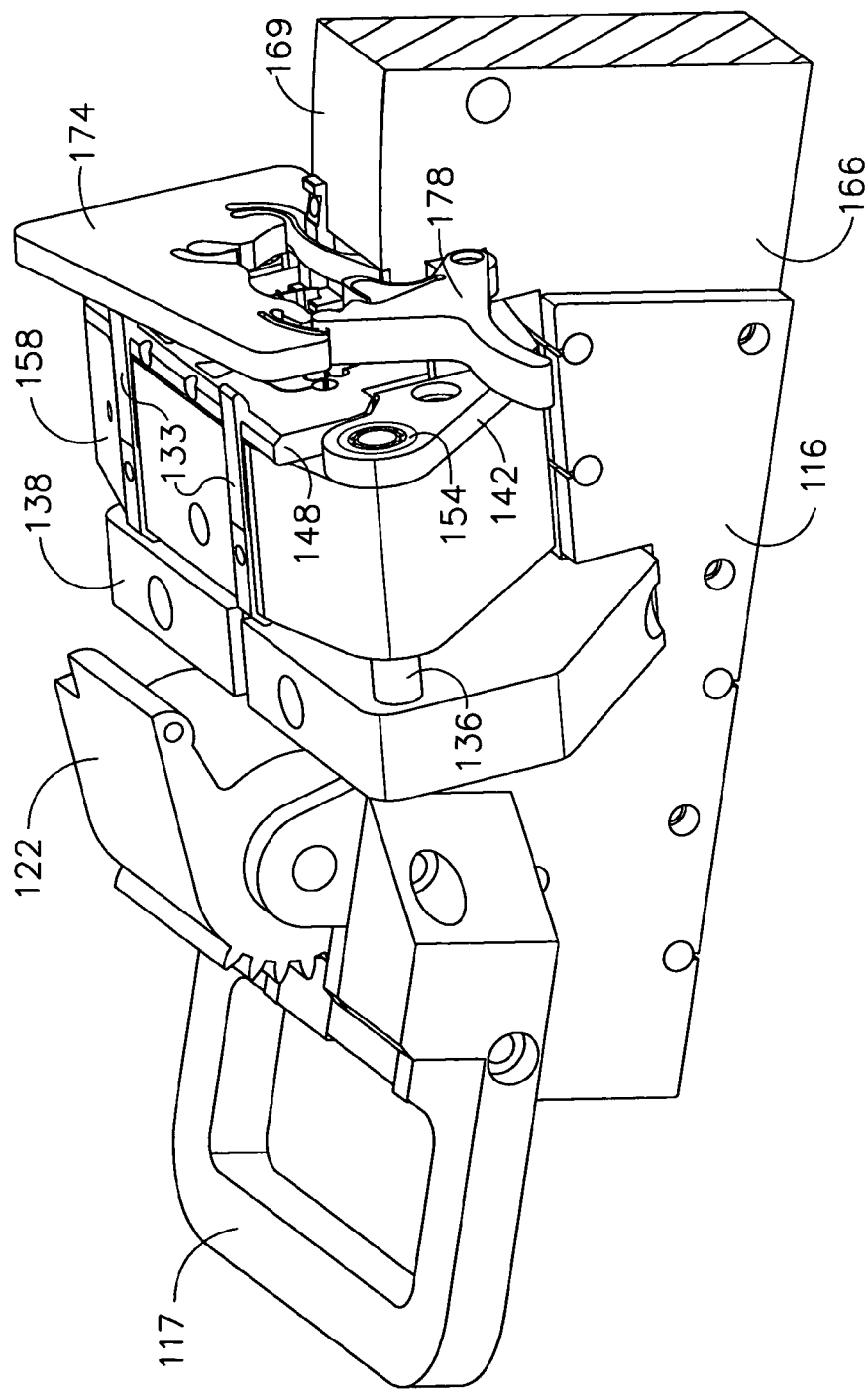
FIG. 12 is an enlarged, partial front perspective view of the work station depicted in FIG. 9.
Figure 13:
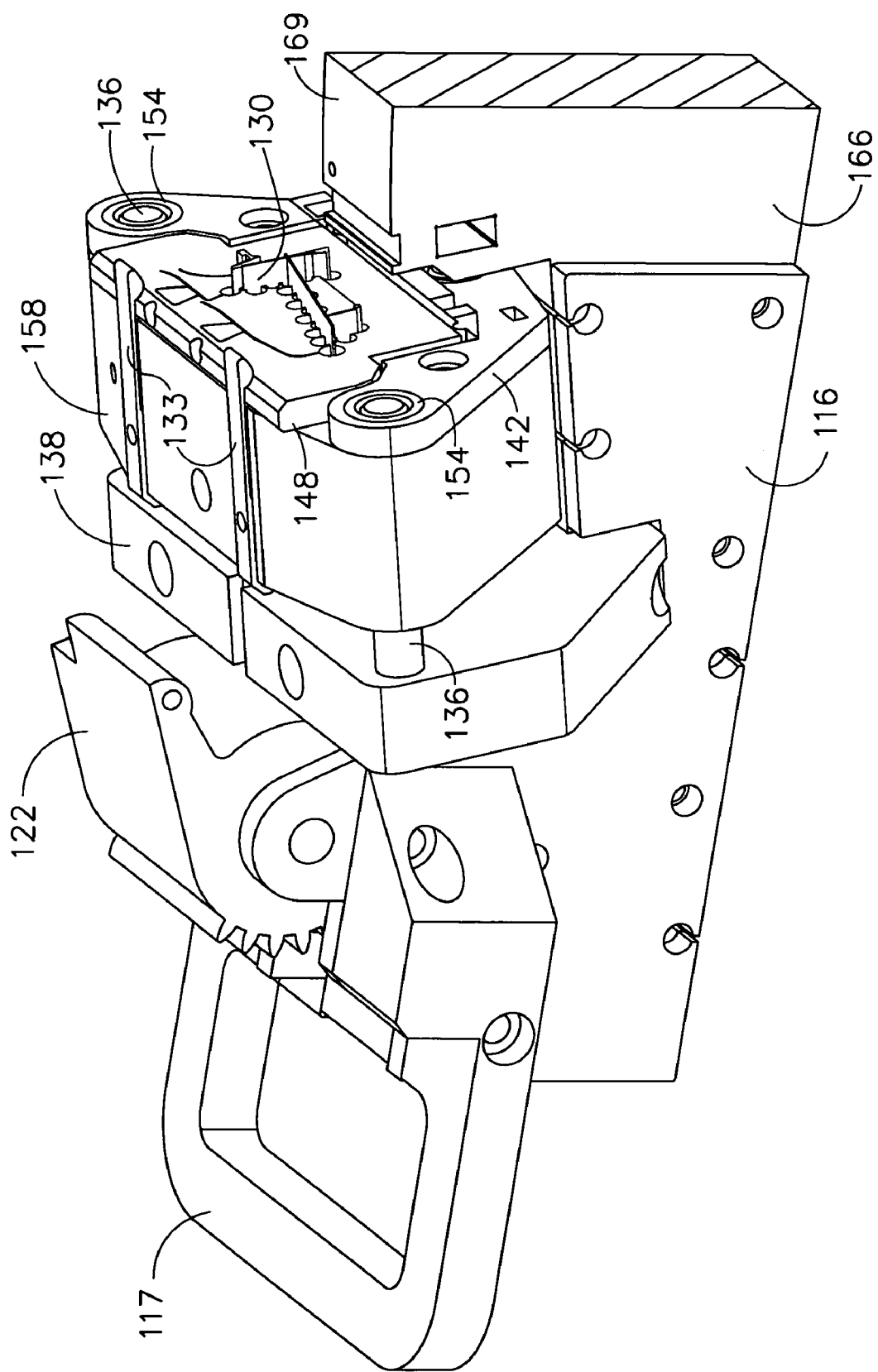
FIG. 13 is an enlarged, partial front perspective view of the work station as depicted in FIG. 12, where certain components of the first mechanism have been omitted for clarity; and, FIG. 14 is an enlarged, partial front perspective view of the work station as depicted in FIGS. 12 and 13, where certain components of the second mechanism have been omitted for clarity.
Figure 14:
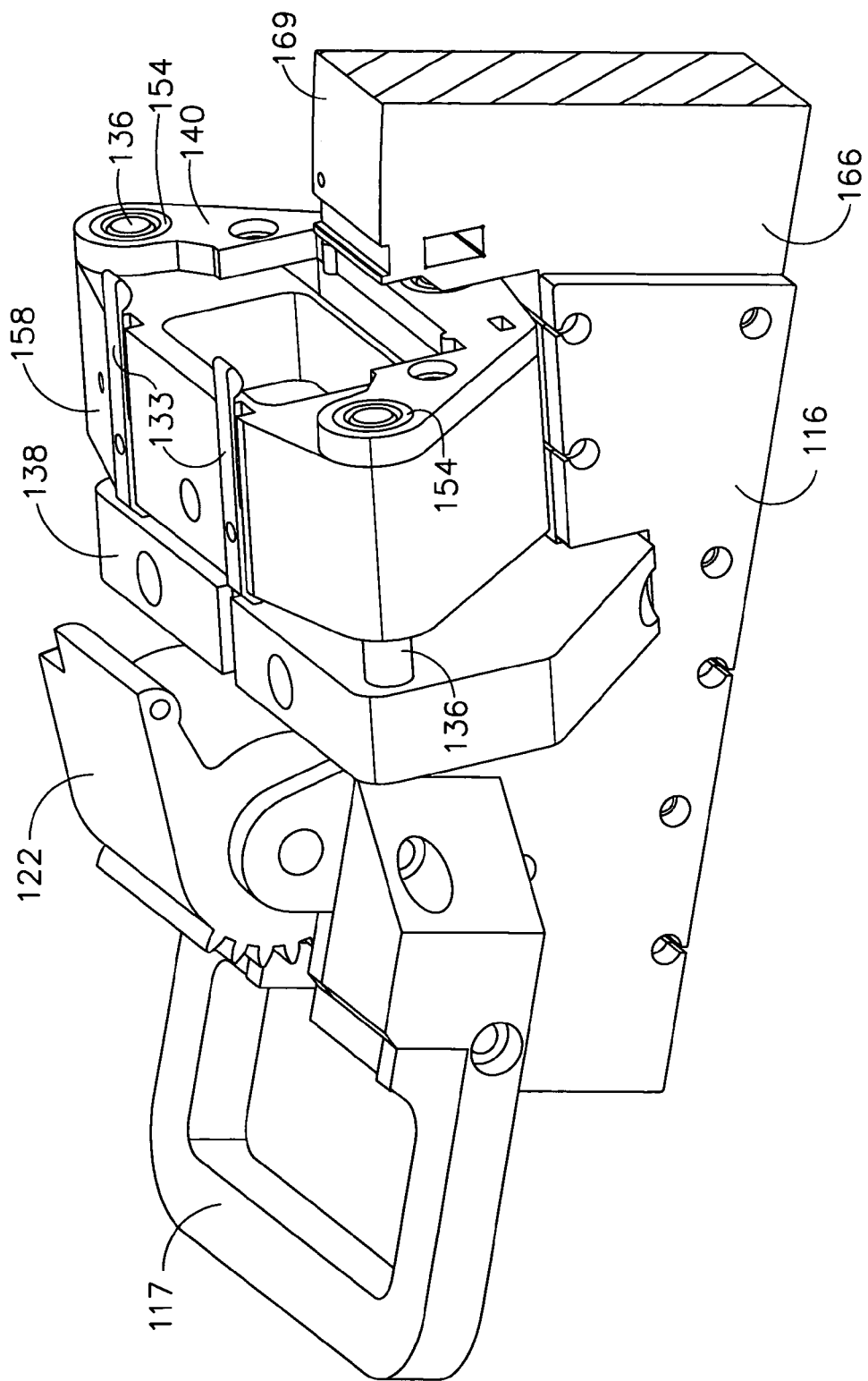

In order to electrically insulate electrode 30 from first portion 34 of second mechanism 32, and consequently first mechanism 26 and workpiece 28, a bearing 54 is preferably positioned between each opening 44 in locator plate 42 and each shaft member 36. Bearing 54 is preferably made of an electrically insulating material, such as ceramic, any polymer material, fiberglass or other non-conductive material. One particular example of such a bearing is identified as Part#RJZI-01-06, which is manufactured by Igus, Inc. of East Providence, R.I. It will also be seen from FIG. 8 that bearings 54 preferably includes a plurality of grooves 56 formed therein which permit fluid flow between each end of bearings 54. This enables the dielectric fluid and other debris to pass therethrough and not affect the ability of second portion 40 to slide along shaft members 36.

It will be seen from FIGS. 4 and 5 that second portion 40 of second mechanism 32 also preferably includes a base member 58 positioned adjacent and connected to holder and locator plates 48 and 42 to provide stability to second mechanism 32. Base member 58 likewise has a plurality of openings 60 formed therein which are sized and spaced to receive a portion of each bearing 54. Base member 58 also has a relatively large opening or pocket 62 formed therein which is configured to function as a manifold and supply dielectric fluid to openings 52 in holder plate 48. It will be understood that opening 62 in base member 58 is in flow communication with a dielectric fluid supply via a tube 63 connected to an opening (not shown) in base member 58. A cover plate 59 is preferably provided adjacent a side of base member 48 opposite electrode 30 in order to retain the fluid within opening 62.

Figure 3:
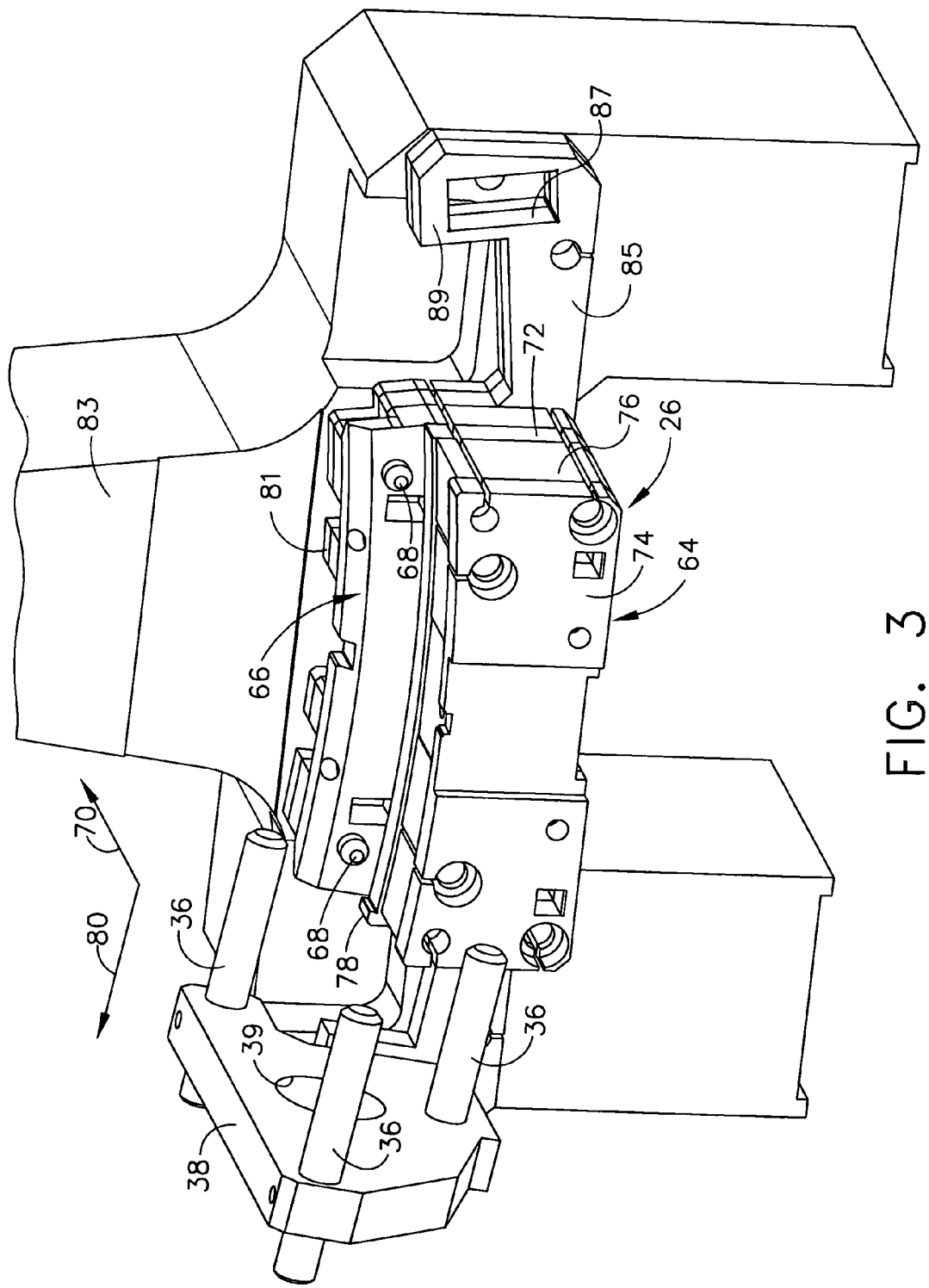
FIG. 3 is a front perspective view of the work station depicted in FIG. 2, where the workpiece has been omitted from the first mechanism and certain components of the second mechanism have been omitted for clarity.

As best seen in FIG. 3, first mechanism 26 includes a base portion 64 for supporting workpiece 28 and a housing 66 positioned adjacent and connected to base portion 64. It will be seen that housing 66 has at least one locator member 68 associated therewith for aligning workpiece 28 in a first direction (indicated by arrow 70). Base portion 64 preferably further includes a first base plate 72 positioned adjacent housing 66, a second base plate 74 positioned in spaced relation to first base plate 72, and one or ore spacer members 76 positioned between first and second base plates 72 and 74, where such items are connected via a plurality of bolts or dowels (not shown). It will be noted that first base plate 72 preferably includes a locator member 78 at an end adjacent to second mechanism 32 so as to align workpiece 28 in a second direction (indicated by arrow 80). Of course, a locator member may be associated with second base plate 72 in addition to or in place of that located on first base plate 72. Such locator member also may be positioned on either side of first and/or second base plates 72 and 74.

It will be seen that the process of loading workpiece 28 into the predetermined position involves the initial step of placing workpiece 28 upon base portion 64 of first mechanism 26. Workpiece 28 is then slid rearwardly (in the direction of arrow 70) until it engages locator member 68 on housing 66 and laterally (in the direction of arrow 80) until it engages locator member 78 on first base plate 72. Thereafter, workpiece 28 is locked in position by means of one or more spring clips 79 which preferably are located adjacent and connected to second base plate 74 (see FIG. 1).

First mechanism 26 preferably further includes one or more spacer members 81 located between housing 66 and a fixture mount 83 located aft of work station 12. It will be noted that spacer members 81 extend laterally beyond base portion 64 of first mechanism 26 so as to form an arm member 85. Each arm member 85 then includes an opening 87 formed therein of a predetermined size and shape.

Figure 7:
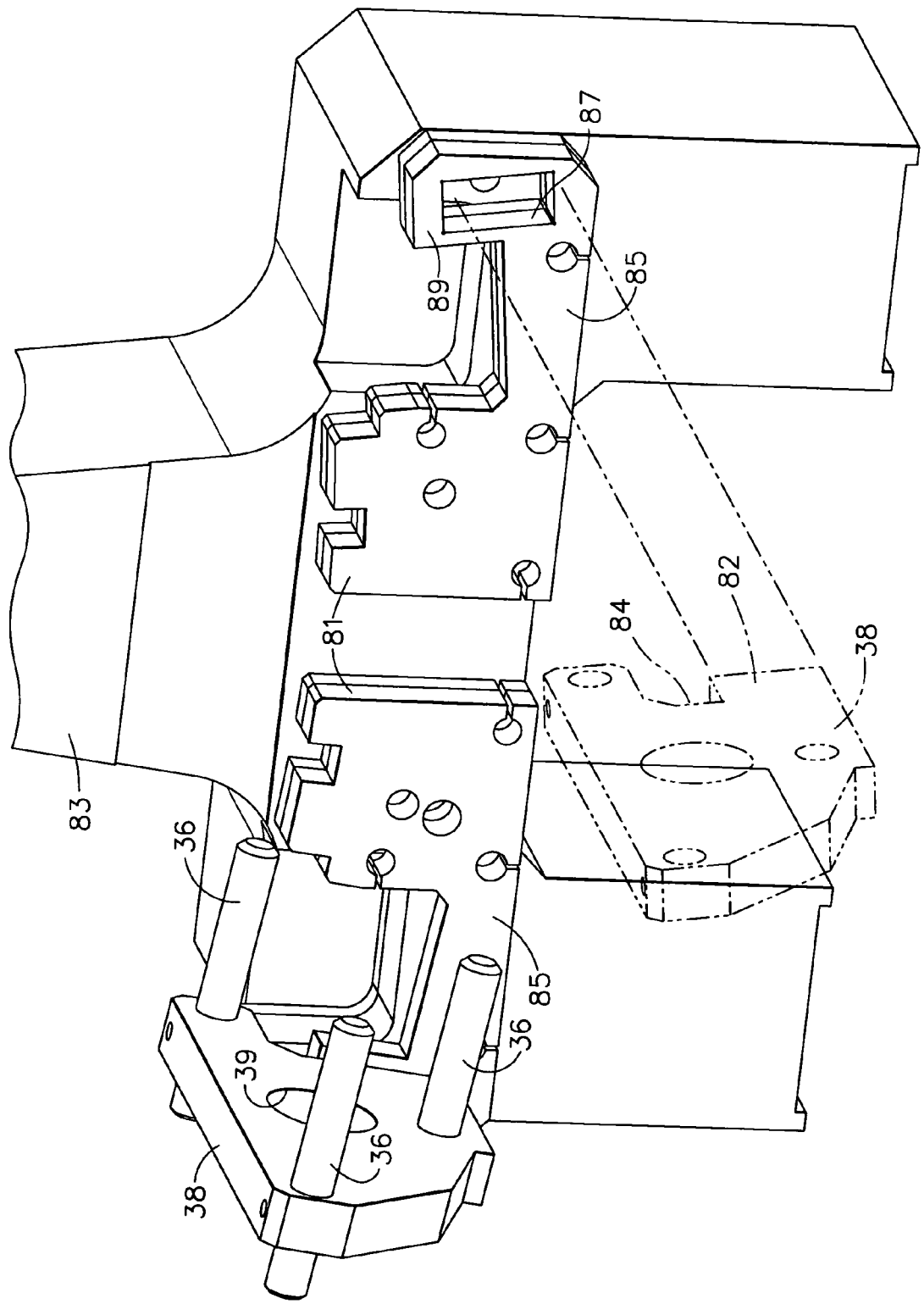
FIG. 7 is a front perspective view of the workstation depicted in FIGS. 2 and 3, where certain components of the first and second mechanisms are omitted for clarity and assembly of the shaft housing to the first mechanism is indicated.

With respect to the direct connection of first mechanism 26 and first portion 34 of second mechanism 32, it will be seen from FIG. 7 that shaft housing 38 includes a male portion 82 and a female portion 84 which are configured to interface with arm members 85 in locking engagement. More specifically, male portion 82 is received in openings 87 of arm members 85 while a portion 89 of arm members 85 is received within female portion 84. A set screw or similar item may be utilized to maintain shaft housing 38 and arm member 85 in their connected position. In this way, mating of shaft housing 38 and arm member 85 is accomplished in a direction substantially perpendicular to the movement of second portion 40 of second mechanism 32 so as to maintain the connection and respective positioning of electrode 30 and workpiece 28 during such movement. In this embodiment, it will be noted that electrode 30 is positioned between shaft housing 38 and first mechanism 26.

In addition to second mechanism 32, a third mechanism 86 (see FIG. 1) may be located on an opposite side of first mechanism 26. Third mechanism 86 is preferably configured like second mechanism 32, but in mirror image, so that it causes relative movement of a second electrode (not shown) with respect to first mechanism 26. Similarly, third mechanism 86 is preferably directly connected to first mechanism 26 in the manner described hereinabove with respect to second mechanism 32 so as to automatically align the second electrode with workpiece 28. Moreover, third mechanism 86 is configured so that the second electrode is likewise electrically insulated from first mechanism 26 and workpiece 28.

FIGS. 9-14 depict a work station 112 for an EDM apparatus 110 having an alternative configuration for positioning electrodes so as to be movable into and out of engagement with a designated portion of a workpiece 128. While much of second mechanism 132 will be similar to that described herein with respect to second mechanism 32, it will be understood that a first mechanism 126 thereof is different from first mechanism 26. Accordingly, the manner of connecting a stationary portion 134 of second mechanism 132 to first mechanism 126, as well as the device utilized to move slide portion 140 of second mechanism 132, will differ. It will also be noted that an exemplary workpiece 128 depicted is a portion of a hanger, which is utilized in a gas turbine engine to house a shroud.

A rack and pinion device, identified generally by numeral 114, preferably receives signals from a controller (not shown) and is utilized to move slidable second portion 140 of second mechanism 132 so that electrode 130 is brought into and out of engagement with workpiece 128 at the designated portion thereof. In this arrangement, it will be appreciated that shaft housing 138 is connected to first mechanism 126 by means of a base member 116 for rack and pinion system 114, as opposed to arm members 85 of spacers 81 in the previous embodiment. More specifically, a slot 139 formed on the bottom of shaft housing 138 is mated with a portion 165 of side base portion 166 so as to be retained in groove 118 of base member 116 (see FIG. 10). As seen in FIG. 11, base member 116 is connected to a base portion 164 of first mechanism 126 via a connecting base portion 120. A handle 117 is also preferably attached to each base member 116 so as to ease handling and placement of work station 112.

It will be seen that connecting base portion 120 further serves to house a first notched rod member 121 of rack and pinion system 114 which interfaces with a gear member 122 and moves generally in a vertical direction. A second notched rod member 123 also interfaces with gear member 122 and moves generally in a horizontal direction. Second notched rod member 123 includes an end portion 124 which preferably is connected to slide portion 140 of second mechanism 132 (e.g., by a shoulder screw or the like). Accordingly, electrode 130 is moved into and out of engagement with workpiece 128 as the rotary movement of gear member 122 created by first notched rod member is translated by second notched rod member 123 to slide portion 140.

It will be understood that besides interfacing with base portion 116 and connecting base portion 120 to establish a predetermined arrangement with shaft housing 138, a side portion 166 of base portion 164 preferably includes a surface 168 which functions to support slide portion 140 as it moves along shaft members 136. It will be appreciated that surface 168 is stepped from a main surface 169 of base portion 164 which is utilized to support workpiece 128.

Regarding first mechanism 126, it will be seen that a locator member 172 is associated with base portion 164 so as to position workpiece 128 properly in a direction indicated by arrow 170. A pair of locator plates 174 and 176 are preferably positioned at each end of base portion 164 and held in place by spring clips 178 and 179, respectively, so as to position workpiece 128 properly in a lateral direction indicated by arrow 180. Locator plates 174 and 176 will then include openings therein so as to permit the ends of workpiece 128 to extend past main support surface 169 and be accessed by electrodes 130.

With respect to second mechanism 132, it will be seen that at least one connector strip 133 is utilized to hold holder plate 148 in position against base member 158. Electrode 130 is retained in position by holder plate 148, which is in turn connected to locator plate 142. As discussed herein for second mechanism 32, locator plate 142 and base member 158 include openings therein which each include a bearing 154 made of a non-conductive material. Thus, slide portion 140 is able to move along shaft members 136 while electrode 130 is electrically insulated from first mechanism 126 (and therefore workpiece 128). At the same time, electrode 130 is automatically aligned with workpiece 128 due to the connection of shaft housing 138 with base portion 164 of first mechanism 126.

Having shown and described the preferred embodiment of the present invention, further adaptations of the electrical discharge machining apparatus and method can be accomplished by appropriate modifications by one of ordinary skill in the art without departing from the scope of the invention.

What is claimed is:

1. A work station for an electrical discharge machining apparatus, comprising:
   (a) a first mechanism for retaining a workpiece in a predetermined position;
   (b) at least one electrode for forming a feature on said workpiece; and,
   (c) a second mechanism for positioning said electrode in a manner that is movable into and out of engagement with a designated portion of said workpiece, said second mechanism further comprising:
      (1) a stationary first portion including a plurality of shaft members retained in a shaft housing, wherein said shaft members are arranged in a predetermined spaced relation;
      (2) a second portion for retaining and positioning said electrode, said second portion including a plurality of openings therein which are slidably positioned on said shaft members; and,
      (3) a bearing positioned between a surface defining each said opening in said second portion and each said shaft member, wherein said bearings have electrically insulating properties;
   wherein said first portion of said second mechanism is connected to said first mechanism so as to automatically align said electrode with said designated portion of said workpiece.

2. The work station of claim 1, wherein said second mechanism is configured so that said electrode is electrically insulated from said workpiece.

3. The work station of claim 1, said second mechanism including three shaft members positioned in spaced, substantially triangulated relation to each other.

4. The work station of claim 1, said shaft housing of said first portion for said second mechanism including a male portion configured so as to be retained in a corresponding mating portion provided in said first mechanism.

5. The work station of claim 4, said shaft housing being configured so that said male portion interfaces with said mating portion of said first mechanism in a direction substantially perpendicular to movement of said second portion of said second mechanism.

6. The work station of claim 1, said first mechanism including an opening configured to retain said shaft housing.

7. The work station of claim 1, said first mechanism including a slot configured to retain said shaft housing.

8. The work station of claim 1, said bearings including a plurality of grooves formed in an inner surface thereof so as to permit fluid flow therethrough.

9. The work station of claim 1, said second portion of said second mechanism further comprising:
   (a) a locator plate including a plurality of openings formed therein, each of said openings having one of said bearings positioned therein so that said locator plate is slidably positioned on said shaft members;

(b) a holder plate configured for retaining said electrode in a predetermined position and orientation; and, (c) at least one clip member for connecting said holder plate to said locator plate.

10. The work station of claim 9, said holder plate including a plurality of openings formed therein adjacent said electrode to permit fluid flow therethrough.

11. The work station of claim 10, said second mechanism further comprising a base member positioned adjacent said holder and locator plates, said base member including a plurality of openings formed therein which also receive each said bearing so that said base member is slidable on said shaft members.

12. The work station of claim 11, said base member including a pocket formed therein in flow communication with said openings in said holder plate.

13. The work station of claim 1, said second mechanism being oriented with respect to said first mechanism so as to permit said electrode to form a feature in a side portion of said workpiece.

14. The work station of claim 1, further comprising a third mechanism located on an opposite side of said first mechanism as said second mechanism, said third mechanism positioning a second electrode in a manner that it is movable into and out of engagement with a second designated portion of said workpiece, wherein a portion of said third mechanism is connected to said first mechanism so as to automatically align said second electrode with said second designated portion of said workpiece.

15. The work station of claim 14, wherein said third mechanism is configured so that said second electrode is electrically insulated from said workpiece.

16. The work station of claim 1, said second mechanism including at least two shaft members positioned in spaced, parallel relation to each other.

17. A work station for an electrical discharge machining apparatus, comprising:

(a) a first mechanism for retaining a workpiece in a predetermined position, said first mechanism further comprising:

(1) a base portion for supporting said workpiece, said base portion of said first mechanism further comprising:

(i) a first base plate positioned adjacent said housing;

(ii) a second base plate positioned in spaced relation to said first base plate; and, (iii) at least one spacer member positioned between said first and second base plates;

wherein at least one of said first and second base plates includes a locator member at an end adjacent said second mechanism so as to align said workpiece in a first direction; and, (2) a housing positioned adjacent and connected to said base portion, said housing including at least one locator member for aligning said workpiece in a second direction;

(b) at least one electrode for forming a feature on said workpiece; and, (c) a second mechanism for positioning said electrode in a manner that is movable into and out of engagement with a designated portion of said workpiece;

wherein a portion of said second mechanism is connected to said first mechanism so as to automatically align said electrode with said designated portion of said workpiece.

18. The work station of claim 17, said first mechanism further comprising at least one spacer member positioned adjacent said housing opposite said first base plate, each spacer member including an arm portion extending beyond said base portion having an opening formed therein which retains a male portion of said second mechanism.

19. An electrical discharge machining apparatus for forming features in a workpiece, comprising:

(a) a dielectric tank;

(b) at least one work station disposed in said tank, each said work station further comprising:

(1) a first mechanism for retaining a workpiece in a predetermined position;

(2) at least one electrode for forming a feature on said workpiece; and, (3) a second mechanism for positioning said electrode in a manner that it is movable into and out of engagement with a designated portion of said workpiece, said second mechanism further comprising:

(i) a stationary first portion including a plurality of shaft members retained in a shaft housing, wherein said shaft members are arranged in a predetermined spaced relation;

(ii) a second portion for retaining and positioning said electrode, said second portion including a plurality of openings therein which are slidably positioned on said shaft members; and, (iii) a bearing positioned between a surface defining each said opening in said second portion and each said shaft member, wherein said bearings have electrically insulating properties;

wherein a portion of said second mechanism is connected to said first mechanism so as to automatically align said electrode with said designated portion of said workpiece;

(c) a device for supplying power to said electrode; and, (d) a device for controlling the position of said second mechanism.

* * * * *